United States Patent [19]
Morweiser et al.

[11] Patent Number: 5,470,485
[45] Date of Patent: Nov. 28, 1995

[54] ELECTROSTATICALLY-EFFECTIVE AIR FILTER MATERIAL

[75] Inventors: Karl-Heinz Morweiser, Birkenau; Klaus Veeser, Weinheim; Harald Stini, Birkenau, all of Germany

[73] Assignee: Firma Carl Freudenberg, Weinheim, Germany

[21] Appl. No.: 397,510

[22] Filed: Mar. 1, 1995

[30] Foreign Application Priority Data

Mar. 5, 1994 [DE] Germany .......................... 44 07 344.5

[51] Int. Cl.$^6$ .......................... B01D 17/06; B01D 24/00
[52] U.S. Cl. ................... 210/748; 95/273; 96/55; 210/505; 428/365; 428/373; 428/374; 521/134
[58] Field of Search .................................. 210/505, 748; 95/273; 96/55; 428/373, 374, 365; 521/134

[56] References Cited

U.S. PATENT DOCUMENTS 4,798,850 1/1989 Brown ...................................... 521/134

OTHER PUBLICATIONS

German Standard EN 143: 1990; Respiratory Protective Devices; Particle Filters; Requirements, Testing, Marking; 16 pages.

German Standard EN 149: 1991; Respiratory Protective Devices; Particle Filters; Requirements, Testing, Marking; 19 pages.

*Primary Examiner*—Morton Foelak
*Attorney, Agent, or Firm*—Kenyon & Kenyon

[57] ABSTRACT

An air filter material for intercepting dust is disclosed. The material is free of lubricants and antistatic agents, and consists of a blend of (I) polyolefin fibers and (II) polyacrylonitrile fibers that are geometrically stable. The fibers (I) are two-component polypropylene/polyethylene fibers of the core/jacket or side-by-side type, and fibers (II) are halogen-free. The fiber blend is washed during the manufacturing process after they are first combined.

16 Claims, No Drawings

ELECTROSTATICALLY-EFFECTIVE AIR FILTER MATERIAL

BACKGROUND OF THE INVENTION

The invention relates generally to an electrostatically effective air filter material that comprises a blend of (I) polyolefin fibers and (II) polyacrylonitrile fibers. In filter material of this type, each of the constituent fibers is free of lubricants and antistatic agents, and any burnishing substances. The present invention also concerns the corresponding process by which such material is manufactured, and the manner in which the air filter material is utilized.

An air filter material of this kind is described in EP-B1 0 246 811 and its corresponding U.S. Pat. No. 4,798,850 (the contents of which are incorporated herein by reference). This patent discloses a procedure wherein polyolefin fibers that are free of lubricants and antistatic agents are mixed with fibers of an addition polymer that also are free of lubricants and antistatic agents. The addition polymer comprises one or more halogen-substituted polyolefins as well as, for example, acrylonitrile units. This goal of that process is the production of an electrostatically effective air filter material having low material costs and high filtration performance, which presents little resistance to the flow of air, and is not flammable. Such an air filter material is said to be suitable for use in dust-protection helmets and masks, among other uses.

An essential feature of this process is that the fibers must be cleansed before being mixed together, so that they do not have a coating of lubricants or antistatic agents. This cleaning is performed, for example, by rinsing the fibers with a nonionic detergent, with alkali, or with solvent, and then rinsing them off in a subsequent rinse procedure.

The resulting air filter material possesses the desired technical attributes for such a filter material, but has the drawback of limited packageability. This material can be manufactured in a geometrically stable manner, e.g., into anatomically shaped breathing masks, only if it is provided with an additional stiffening reinforcement ply.

EP-B1 0 246 811 teaches that the nonwoven fabric be "lightly" needled at 25 punctures/cm. To manufacture stiffer or denser nonwoven mats, it merely suggests more intensive needling. In many cases, however, this action does not lead to the desired stiffness that is achieved with reinforcement plies. The latter, however, always requires the use of additional material, and also considerably increases the flow resistance.

This invention is directed to the problem of providing an air filter material of this general type and efficacy, but without the drawbacks of the known approaches. In particular, this invention permits the formation of geometrically stable air filters into such shapes as may be required for use in breathing masks or other air-delivering devices without the need for an additional reinforcement ply.

SUMMARY OF THE INVENTION

The present invention provides for an electrostatically effective air filter material, consisting of a blend of polyolefin fibers that are two-component polypropylene/polyethylene fibers of the core/jacket or side-by-side type; and halogen-free polyacrylonitrile fibers. The filter material is geometrically stable. The fibers are rendered free of lubricants and antistatic agents by washing after the two types of fibers are commingled.

DETAILED DESCRIPTION

An air filter constructed according to the principles of the invention comprises a blend of two types of fibers, I and II. Fibers (I) consist of polypropylene/polyethylene core/jacket or side-by-side fibers, and fibers (II) consist of halogen-free polyacrylonitrile. The fibers (I) and (II) used should preferably be thinner than 100 µm. The staple length of the fibers is preferably 40 mm to 100 mm. The ratio between fiber (I) and fiber (II) preferably lies in the range of 30:70 to 80:20 with respect to one surface area of the air filter material. In contrast to the method set forth in EP-B1 0246 811, in the present method of manufacture, the fibers are mixed together prior to being washed and subsequently dried.

Unexpectedly, this produces an air filter material that can in fact be deep-drawn, and that in any event is geometrically stable. In describing the filter material as "geometrically stable," what is meant is that the surface forming the filter material presents the greatest possible resistance to deflection by external forces.

The nonwoven fabric is then formed by carding, which is followed by needling to effect consolidation of the fibers. The heterofilament polyolefin fibers (these are two-component polypropylene/polyethylene fibers of the core/jacket or side-by-side type) are then thermally activated. Thermal activation is generally known in the art. In each case, the lower-melting component of the heterofilaments, i.e., the polyethylene, melts. This imparts to the nonwoven fabric the necessary stiffening into a nonwoven mat. Concurrent deformation under pressure may also be applied (where applicable).

Through this process, particularly strongly deformed, stable filters can be obtained by stamping, punching, or welding in a mold, or by deep drawing.

The filter material according to the invention is of particular use in instances where solid and liquid aerosols must be electrostatically intercepted. Its deep-drawing capability allows utilization not only for anatomically shaped filters for human respiratory protection, but also as a preshaped component in, for example, narrow and/or curved installation spaces of air-conveying systems, such as air conditioners in, motor vehicles, vacuum cleaners, or cooling fans.

Surprisingly, the selection of the fiber material pair (I) and (II) according to the invention also results in a hitherto unattained stability of the electrostatic charge applied during carding. Stiffening of fiber nonwoven mats by means of thermoplastic binding fibers previously led, during heat treatment, to a drastic drop in the electrostatic charge on the fibers, so that after packaging this property was almost entirely lost. With the present invention this is no longer observed.

A further advantage of the invention is that less emphasis need be placed on the danger of dirtying the fibers during mixing. In contrast, this is a basic concern in EP-B1 0 246 811, in which the fibers that are mixed must be washed clean, whereas in the present invention, washing occurs subsequent to mixing. This substantially simplifies the process of producing the filter material.

The air filter material of the invention may be used by itself, or as an effective, filtering component of a laminate made from a plurality of flat formed elements. For example, a nonwoven mat or a textile with a purely mechanical reinforcing effect can be needled to the air filter material.

EXAMPLES

1. Filtration measurements were conducted on air filters constructed according to the principles of the invention in the form of deep-drawn masks. These measurements were conducted in accordance with EN 143, sections 6.3 and 6.4.1 (this designation refers to a standardized test in use in Europe concerning particle filters for use in respiratory protective devices, and has the designation "European Norm EN 143", the contents of which are incorporated herein by reference):

| Pressure drop (Pa) | Permeability (%) |
|---|---|
| 15 | 11.9 |
| 23 | 4.9 |
| 44 | 2.4 |
| 66 | 0.3 |

2. Similarly, flat filter units constructed according to the principles of the invention yielded the following data:

| Pressure drop (Pa) | Transmittance (%) |
|---|---|
| 4 | 3.5 |
| 11 | 1.0 |
| 16 | 0.4 |

Flammability tests were conducted in accordance with EN 149, section 5.5, and met the test standards. (This test designation refers to a standardized test in use in Europe concerning respiratory protective devices, and has the designation "European Norm EN 149", the contents of which are incorporated herein by reference.)

What is claimed is:

1. An electrostatically effective air filter material, consisting of a blend of:

type (I) polyolefin fibers that are two-component polypropylene/polyethylene fibers of the core/jacket or side-by-side type; and type (II) halogen-free polyacrylonitrile fibers, wherein the filter material is geometrically stable and wherein the fibers are free of lubricants and antistatic agents.

2. An air filter material according to claim 1, wherein the ratio of type (I) fibers to type (II) fibers is in the range of 30:70 to 80:20, relative to a surface of the filter material.

3. An air filter material according to claim 1, wherein the fibers are thinner than 100 µm.

4. An air filter material according to claim 2, wherein the fibers are thinner than 100 µm.

5. An air filter material according to claim 1, wherein the fibers are subjected to a shaping operation selected from the group of shaping operations consisting of stamping, punching, welding, and deep-drawing.

6. An air filter material according to claim 2, wherein the fibers are subjected to a shaping operation selected from the group of shaping operations consisting of stamping, punching, welding, and deep-drawing.

7. An air filter material according to claim 1, wherein the staple lengths of the fibers is between 30 mm and 200 mm.

8. An air filter material according to claim 1, wherein the air filter material is provided as part of a laminate made from a plurality of flat formed elements.

9. An air filter material according to claim 5, wherein the air filter material is provided as part of a laminate made from a plurality of flat formed elements.

10. A method for filtering out solid or liquid aerosols, comprising the steps of:

mixing together
      (I) a quantity of polyolefin fibers that are two-component polypropylene/polyethylene fibers of the core/jacket or side-by-side type with
      (II) a quantity of halogen-free polyacrylonitrile fibers;

washing the resulting mixture of fibers so that it is free of lubricants and antistatic agents;

forming the mixture of fibers into a non-woven fabric by carding;

needling the fabric and electrostatically charging the fabric; and forming the fabric into a shape appropriate for use as a filter.

11. A process for manufacturing an electrostatically effective air filter material which is free of lubricants and antistatic agents comprising the steps of:

mixing together
      (I) a quantity of heterofilament polyolefin fibers that are two-component polypropylene/polyethylene fibers of the core/jacket or side-by-side type with
      (II) a quantity of halogen-free polyacrylonitrile fibers;

at a weight ratio between 30:70 to 80:20 for the type I fibers with respect to the type II fibers;

washing the resulting mixture of fibers so that it is free of lubricants and antistatic agents;

drying the fibers;

forming the mixture of fibers into a non-woven fabric by carding;

needling and stiffening the fabric; and thermally activating the heterofilament fibers.

12. A process according to claim 11, wherein the fibers employed are thinner than 100 µm.

13. A process according to claim 11, wherein the staple lengths of 30 µm to 200 µm are selected for the fibers.

14. A process according to claim 11, further including the step of shaping the nonwoven fabric.

15. A process according to claim 11, further including the step of combining the air filter material with a mechanical reinforcement to form a laminate.

16. A process according to claim 11, further including the step combining the air filter material with a plurality of flat formed elements.

* * * * *